United States Patent
Crewson et al.

(10) Patent No.: US 6,741,484 B2
(45) Date of Patent: May 25, 2004

(54) POWER MODULATOR HAVING AT LEAST ONE PULSE GENERATING MODULE; MULTIPLE CORES; AND PRIMARY WINDINGS PARALLEL-CONNECTED SUCH THAT EACH PULSE GENERATING MODULE DRIVES ALL CORES

(75) Inventors: Walter Crewson, Ridgefield, CT (US); David Woodburn, Caterham (GB)

(73) Assignee: ScandiNova AB, Stockholm (SE)

( * ) Notice: Subject to any disclaimer, the term of this patent is extended or adjusted under 35 U.S.C. 154(b) by 0 days.

(21) Appl. No.: 10/035,143

(22) Filed: Jan. 4, 2002

(65) Prior Publication Data

US 2003/0128554 A1 Jul. 10, 2003

(51) Int. Cl.[7] .............................................. H02M 3/315
(52) U.S. Cl. ......................................... 363/72; 363/131
(58) Field of Search .......................... 363/65, 71, 72 O, 363/131

(56) References Cited

U.S. PATENT DOCUMENTS

| | | | | |
|---|---|---|---|---|
| 4,682,114 A | * | 7/1987 | Aucouturier et al. | 328/67 |
| 4,704,543 A | * | 11/1987 | Barker et al. | 307/106 |
| 5,365,421 A | * | 11/1994 | Eastham | 363/71 |
| 5,905,646 A | * | 5/1999 | Crewson et al. | 363/71 |
| 6,359,424 B2 | * | 3/2002 | Iida et al. | 323/251 |

* cited by examiner

Primary Examiner—Jeffrey Sterrett
(74) Attorney, Agent, or Firm—Bacon & Thomas PLLC

(57) ABSTRACT

A power modulator includes a plurality of magnetic cores, at least one secondary that surrounds all of the magnetic cores, and at least one pulse generating module made up of an energy storage capacitor, switching means electronically controllable at turn-on and turn-off, a diode or an assembly of series-connected diodes connected in parallel with output conductors, and a set of single-turn or multi-turn primary windings, each set of primary windings surrounding a respective one of the plurality of magnetic cores, the sets of primary windings being connected in parallel to thereby provide a power modulator where each of the pulse generating modules drives all of the plurality of magnetic cores.

6 Claims, 8 Drawing Sheets

Figure 7: (Prior Art)

POWER MODULATOR HAVING AT LEAST ONE PULSE GENERATING MODULE; MULTIPLE CORES; AND PRIMARY WINDINGS PARALLEL-CONNECTED SUCH THAT EACH PULSE GENERATING MODULE DRIVES ALL CORES

BACKGROUND OF THE INVENTION

1. Field of the Invention

This invention relates to power modulators, and more specifically to power modulators having pulse generating modules utilizing primary and secondary windings.

2. Description of Related Art a. Modulators, General Description and Definitions of Terminology A modulator is a device which controls the flow of electrical power. When one turns on an electric lamp and turns it off again, one could be said to be modulating the current that feeds the lamp. In its most common form, a modulator delivers a train of high power electrical pulses to a specialized load like a microwave generator. Most of the world's high power radar sets use modulators to deliver power pulses to a microwave source, which, in turn, feeds the power, in the form of periodic bursts of microwaves, to an antenna structure. Other possible applications of such power modulator are listed in the text below.

In the decades since World War II, the basic structure of power modulators has not changed significantly. A conventional modulator consists of a power supply, which receives power from an AC power line, steps up the voltage, rectifies the power to produce direct current DC power, and is used to deliver energy to a reservoir, usually formed by an energetic capacitor bank. This is necessary because the input power line cannot deliver the peak power that is required, so the reservoir is used to deliver the peak power in small bites of energy, and is replenished or refilled by the DC power supply at a reasonably constant rate with much lower average power.

Part of the energy in this reservoir is then transferred to a second smaller reservoir, usually a pulse-forming network (PFN). The PFN is a network of capacitors and inductors designed to deliver power to a load in the form of a rectangular (flat-topped) pulse with a fast rise and fall-time as compared to the pulse width or duration.

The pulse-forming network (an artificial transmission line or delay line) is then switched to connect it to the primary side of a pulse transformer, usually but not always a voltage step-up transformer. The PFN voltage before switching is V, and the voltage applied to the pulse transformer primary is V/2 or a bit less. This is one disadvantage of the PFN-technology. The pulse transformer turns ratio (voltage step-up ratio) must be twice as large with a PFN as with the present invention.

The PFN discharges completely in a time T (typically a few to a few tens of microseconds), holding a reasonably constant voltage on the pulse transformer primary and producing a reasonably flat output pulse on the transformer secondary. But if a pulse flatness of 0.1 percent or so is required, then the PFN must have a very large number of inductor-capacitor (LC) sections and it will be difficult to adjust. Also, if any component in the PFN should fail, the PFN will require a new adjustment when the new part is installed, as all the parts values and positions are very critical in a PFN.

Having delivered the pulse, the PFN must be recharged completely to voltage V for the next pulse. To maintain a pulse-to-pulse repeatability of a few tenths of one percent, this large charging voltage "swing" must occur with great precision. Also, fully charging and fully discharging all the PFN capacitors for each pulse, several hundred to several thousand times per second, puts a heavy strain on the dielectric material in these capacitors, and this forces the capacitors to be designed with very low stress and hence a very low energy density. This makes the PFN a large structure in comparison to the new invention concept, where the capacitors do not discharge and recharge for each pulse and so can have much higher energy density.

To summarize, the disadvantages of prior art modulators are:

The voltages on the primary side of the pulse transformer are high, typically 10 kV or more.

The PFN must be fully charged to the 10–20 kV range for each pulse, and is fully discharged during the pulse, placing high stress on its capacitors.

The PFN capacitors have low energy density for the above reason, so they are quite large in comparison to the lower-stress capacitors used in the new concept.

If a short circuit occurs at the load (as happens frequently with magnetron tubes), there is no way to interrupt the flow of current, as the high voltage PFN switch (a gas-filled thyratron) cannot be turned off until its current falls to zero.

If a component in the PFN fails, it is necessary to re-tune the PFN for optimal pulse shape after the component is replaced. This is laborious and dangerous work, as it must be done with high voltage applied to the PFN.

If a different pulse width is needed, it is necessary to replace and re-tune the PFN structure.

b. Pulse Transformers

The story of the so-called fractional-turn pulse transformer begins with an invention of Nicholas Christofilos which was assigned to the U.S. Government's Lawrence Livermore National Laboratory (LLNL) in the early 1960s. At that time, the laboratory was named Lawrence Livermore Laboratory or LLL. This invention disclosed a way to use a large number of toroidal (doughnut-shaped) magnetic cores, each core driven by a high voltage pulse generator at several tens of kilovolts (kV) (using a spark-gap switch and a pulse-forming network or PFN) to generate an accelerating potential of several hundred kV to several megavolts (MV) to accelerate a beam of charged particles. The basic idea of this so-called Linear Magnetic Induction (LMI) Accelerator is shown below in FIGS. 1 and 2.

FIG. 1 illustrates a set of toroidal magnetic cores arranged so their central holes surround a straight line, along which the particle beam is to be accelerated.

FIG. 2 shows the LMI structure with more details added; one high voltage (HV) driver system is shown (each core has one) and the particle beam path is indicated.

The key feature of this type of accelerator is that it has an outer surface which is at ground potential. The voltage which drive the individual cores all appear to add in series down the central axis, but do not appear anywhere else. This means the accelerator does not radiate energy to the outside world and is easy to install in a laboratory as it needs no insulation from its surrounding. An 800 kV LMI accelerator was built at LLL in the 1960s (The ASTRON accelerator), and was used for electron-beam acceleration in fusion experiments. A larger LMI machine (FXR, for flash x-ray) was built at that laboratory in the 1970s, and accelerated an electron beam pulse into an x-ray conversion target. FXR was used for freeze-frame radiography of explosions.

The operating principle of the LMI accelerator can be illustrated with the aid of FIG. 3, which shows a cross-section of the machine in a plane that includes the beam axis.

Some rules of the game are needed to discuss the behavior of the multiple-core structure shown in FIG. 3. First, the right-hand rule is needed. This (arbitrary) rule states that if you grasp a conductor with your right hand, with your thumb pointing in the direction of positive current flow, then your fingers will curl around the conductor in the direction of the magnetic flux lines that encircle the conductor. Applying that rule to FIG. 3, the magnetic flux induced in the toroidal magnetic cores will circulate as shown. A "dot" is used to indicate flux vectors pointing toward the reader, and an X is used to represent flux vectors pointing away from the reader.

Applying this rule to the particle beam flowing toward the right along the axis of the structure in FIG. 3, one find that the magnetic flux generated by this beam circulates in the direction opposite to the flux induced by the primary current, which is correct. If we think of this as a transformer, and the beam as a short circuit across the secondary winding, then the current in this secondary will flow in a direction to cancel the flux induced by the primary, causing no net flux to be induced in the magnetic cores and thus presenting a short circuit to the primary power source. No flux change in the cores means no voltage on the primary windings, and this is a short circuit by definition. A beam of positively charged particles (protons) would therefore be accelerated toward the right by the structure, and a beam of negatively charged particles (electrons) would be accelerated toward the left.

One now applies another rule of electronics, namely that the voltage induced in a conductor which surrounds a magnetic flux is equal to the rate of change of that magnetic flux. Consider the path ABCD, which surrounds the flux of all five cores. The voltage induced in a wire that follows this path would equal the rate of change of flux in all of the five cores together. But each core is driven by a primary voltage V, so each core has a rate of change of flux equal to V. Therefore, the voltage induced along the path ABCD would be 5V. The structure acts as a voltage step-up transformer. Another rule is that in a transformer, the ratio of secondary voltage to primary voltage equals the ratio of secondary turns to primary turns, so the LMI accelerator of FIG. 3 has an effective turns ratio of five, yet the path ABCD represents only a single turn. So the primary must be ⅕ of a turn, hence the LMI accelerator can be thought of as a transformer with a fractional-turn primary.

c. Additional Related Art

FIG. 4 is a sketch of the pulse transformer connection that is disclosed in U.S. Pat. No. 5,905,646, Crewson, et.al, May 18, 1999. For simplicity, two pulse generating modules are shown. Each module, as can be seen, drives a single-turn primary (1) that loops around one of the two magnetic cores. Each module contains a capacitor charged to voltage V, and has a catch diode or inverse diode D, to protect the switch from a destructive "backspike" of voltage when the switch turns off.

The above given U.S. Pat. No. 5,905,646 emphasizes the idea that each module drives an independent turn in the primary structure. This is done to assure that all the module switches would conduct the same current. But this restriction opens the modulator up to a potentially destructive fault mode. To understand the destructive fault, assume that the two switches in FIG. 4 do not conduct at precisely the same time. If the upper switch begins conducting a fraction of a microsecond earlier than the lower switch (or vice versa), trouble strikes. If this occurs, the upper magnetic core carries flux in the direction shown (flowing down into the page at the X and up out of the page the dot symbol). This flux induces a current to flow in the secondary and load as shown. No flux is yet present in the lower core, as its module switch is still non-conducting. But the current flowing in the secondary winding will induce a flux in the lower core opposite the direction indicated. This flux will induce a current in the lower module connection as shown, and this current causes the diode D in the lower module to conduct.

Now, when the switch in the lower module does conduct, the applied voltage back-biases the lower diode (which is conducting) and this forces the diode to turn off. Turning off a conducting diode in a few nanoseconds when it is conducting a high current will usually destroy the diode. When the diode is destroyed, it becomes a short-circuit. This short circuit then draws an almost unlimited current through the lower module switch and destroys the switch.

SUMMARY OF THE INVENTION

It is an object of the present invention to eliminate the above-mentioned drawback in the prior art modulator as in U.S. Pat. No. 5,905,646. Another object of the present invention is to provide a power modulator with a primary winding connection that eliminates the need to have an equal number of pulse generating modules and primary windings. It is yet another object of the present invention to provide a power modulator that eliminates the earlier mentioned drawbacks in prior art power modulators in that:

the voltages on the primary side of the pulse transformer are low, typically 1 kV or less;

there is no PFN, hence all the disadvantages of the PFN are avoided because the modulator switches are semiconductors like IGBTs or MosFets, which can be turned off with current flowing in them to terminate the pulse;

the energy storage capacitors do not discharge more than a few percent during a pulse, so their energy density can be much higher than for PFN capacitors;

if a short circuit occurs at the load, this can be detected by observing the sudden drop in load voltage, generating a signal that trips a fast comparator which removes the low-voltage gate pulses from the semiconductor switches, terminating the pulse (prior art modulators use overcurrent detectors for this purpose, which are much less fast in operation and allow much higher current to flow before turn-off); and if a different pulse width is needed, this can be provided by simply changing the timing of the solid-state switch triggers, an operation that occurs at low voltage and can be done from the computer control station, allowing simple electronic adjustment of pulse width.

These advantages lead to the consequent advantages of much smaller size and very much longer service life for the solid-state modulator system as compared to the old-technology PFN/Thyratron.

It is still another object of the present invention to provide a power modulator where different pulse generating modules can be turned on or turned off at different times. To be able to turn on or turn off the pulse generating modules at different times is useful to remove overshooting or ringing at the start of the pulse.

For the sake of clarity in the description, the discussion will be limited to the case of two pulse generating modules. This is by no means a restriction of the invention, which on the contrary works with any number of pulse generating modules.

The addition of two more single turns as shown in FIG. 5 will completely eliminate the earlier mentioned overvoltage failure mode, and will simultaneously eliminate the restriction of having equal numbers of pulse generating modules and primary windings. In prior-art modulators, built under U.S. Pat. No. 5,905,646, one is restricted to having one pulse generating module per primary winding and at least one primary winding per core section. With the present invention, this restriction is removed, and one can use any number of modules. The prior art requires that each core section be driven by the same number of modules. But with the present invention, we can use any number of modules and still provide the same drive signal to each core. This is a strong economic advantage in favor of the present invention.

When the wires (11) in FIG. 5 are added, then whichever module switch is first to conduct will control the circuit until the other switch closes. If the upper switch conducts before the lower one, then the upper module will drive flux in both cores, not just the upper core. This will prevent the lower diode from being drawn into conduction, as this diode will be back-biased. The effect is nearly the same as if all the primaries were connected in parallel, in that the "early" switch will impose a positive voltage on all the diodes in the "late" modules.

One could further simplify things in fact, and connect all the primaries in parallel. This is not obvious, but a look at FIG. 4 will help one see that it works. If all the switches do in fact close at the same time, then there is no voltage between points P and R in the figure. If the points Q and T are connected together, there is no voltage between these points either. If there is no voltage between P and R, then it is possible to connect these points together as well, without causing any additional current to flow, so the circuit will work just the same with all the primaries connected together.

Both of the above connections will in fact serve to equalize the module currents, where the independent connection claimed in U.S. Pat. No. 5,905,646 does not achieve this result. This is because for the first time, it is guaranteed that the load impedance presented to all the pulse generating modules is exactly the same. In the prior art, this is not guaranteed. Of the two primary connections that are given above, the one shown in FIG. 5 is to be preferred over the idea of simply connecting all the primaries in parallel, since with all the primaries in parallel, any diode failure in any module will draw all the current from all the modules into the fault, and this could be quite destructive to the switches. The connection of FIG. 5 eliminates this possibility.

DETAILED DESCRIPTION OF THE PREFERRED EMBODIMENTS

Below is given a detailed description of how to design the power modulator in the present invention by way of example, along with some preferred embodiments of the invention. The preferred embodiments and the design example are just illustrative and they should by no means be seen as limitations of the invention.

Figure 5:
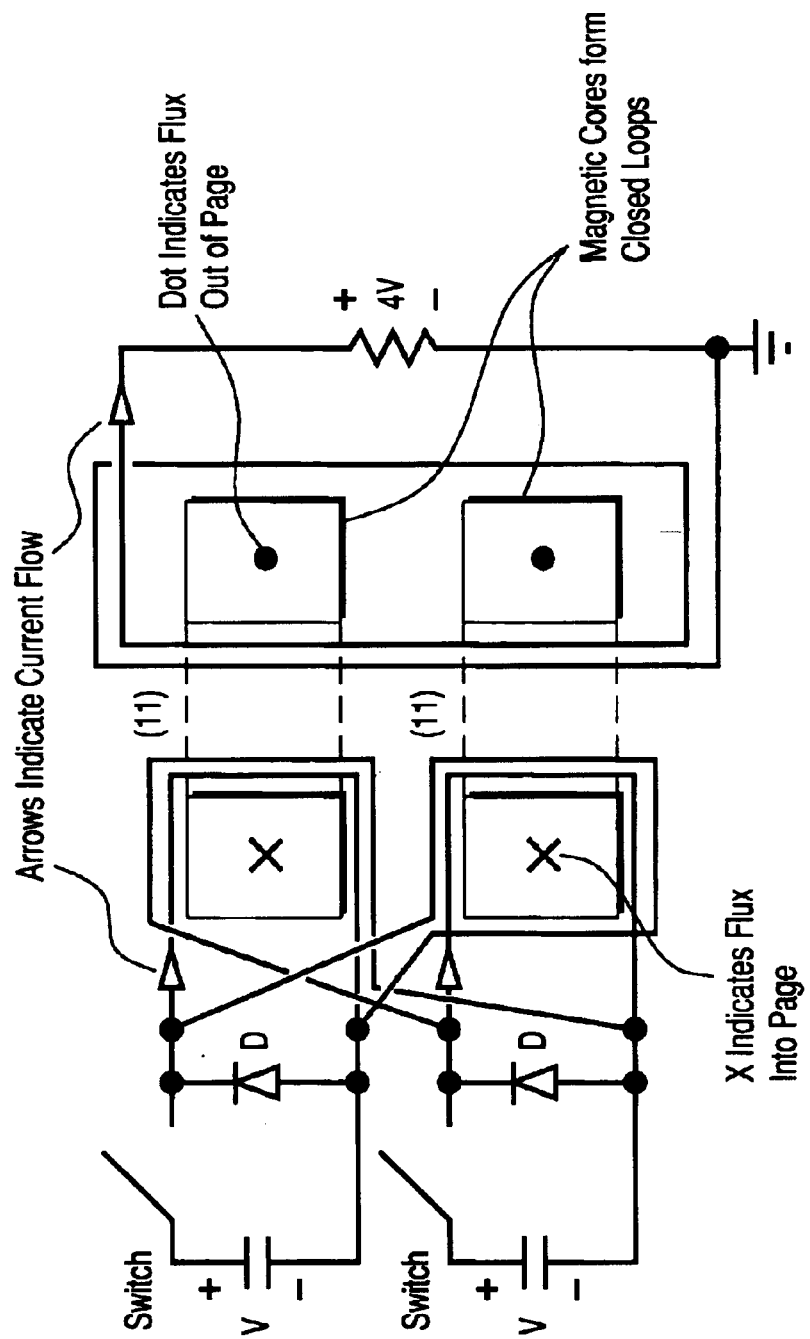
FIG. 5 shows a schematic view of a half-turn primary connection with two pulse generating modules according to the present invention.

The present invention is a power modulator. The power modulator comprises: pulse generating modules, where each pulse generating module has a connection of primary windings that surround a set of magnetic cores, and a secondary winding that surrounds all of the magnetic cores. The pulse generating modules furthermore comprise an energy storage capacitor, switching means and a diode or an assembly of series-connected diodes. The diode, or assembly of series-connected diodes, is connected between the switching means and the conductor that returns the current to the capacitor. The switching means might be any switch known to one skilled in the art of electronics, such as, for example, an IGBT solid-state switch. The pulse generating module/modules in the modulator is/are, as mentioned above, provided with a connection of the primary windings, and which is shown in FIG. 5, for the special case of a power modulator with two pulse generating modules and two magnetic cores. It is a power modulator with these characteristics that is referred to in the embodiments below.

Figure 7:
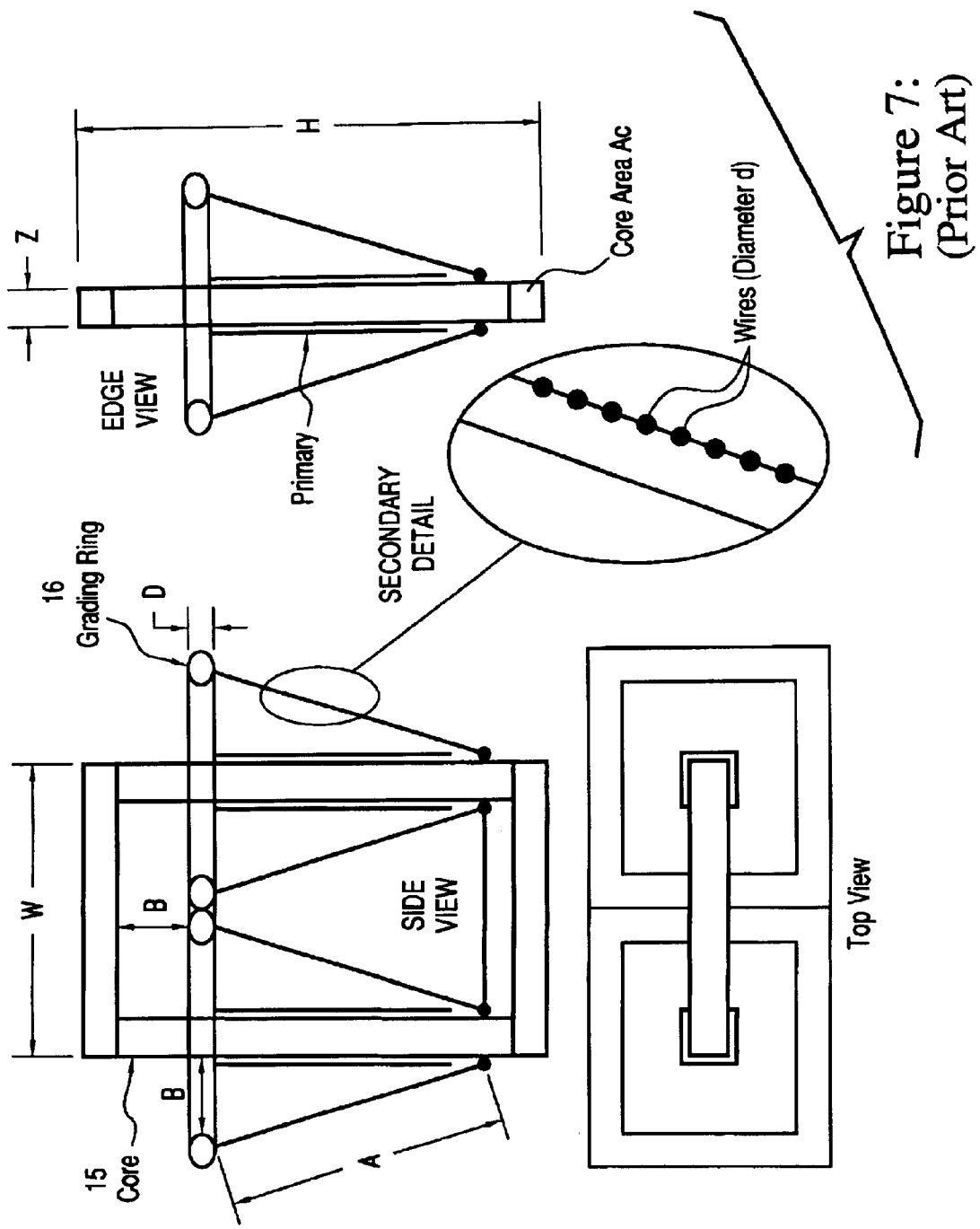
FIG. 7 shows some views of typical high voltage pulse transformers.

As was emphasized earlier, the connection shown in FIG. 5 completely eliminates the destructive fault mode that frequently occurs in prior art modulators. FIG. 5) illustrates this connection with two pulse generating modules and two cores. This is just an illustration, the number of modules can be any number as can the number of cores. All that is needed to obtain a power modulator with more than two pulse generating modules is to connect all modules via primary windings around each magnetic core, so that each core is surrounded by a primary winding from every module. It is therefore a simple matter to add any number of modules to any number of cores. As an example one can look at a power modulator having N pulse generating modules and M magnetic cores. If one should build a power modulator using only single-turn primaries and the connection of the present invention, the total number of single-turn primaries would be 2M×N, including 2M single-turn primaries from each pulse generating module should surround M cores (one primary turn per core "leg", two "legs" per core as shown in FIG. 7), and N pulse generating modules. It is important to note that, in a preferred embodiment, the pulse generating modules are not connected together by an external connection such as a wire. The only connection that exists between the modules is the induced one caused by the magnetic flux in the cores. It is of course possible to interconnect the modules by connecting all the primaries in parallel, even if this opens up the earlier mentioned possible fault that; with all the primaries in parallel, any diode failure in any module will draw all the current from all the modules into the fault, and this could be quite destructive to the switches.

Another embodiment of the invention consists of a power modulator with a single pulse generating module having primary windings that surrounds all cores. In this way the single module drives all the magnetic cores.

It should be noted that the primary windings discussed above can be either single-turn or multi-turn primary windings. In the latter case there is the condition that the volts per turn in all primary windings are the same, i.e. if there is a difference in the voltage V in capacitors belonging to different pulse generating modules, then this difference should be reflected in the number N of turns belonging to the primary windings, such that V/N are equal for all primary windings. If this condition is not met, the primaries will fight each other and draw excessive currents from the pulse generating modules. If all the voltages on the capacitors are the same, then the number of turns in each multi-turn must be the same to satisfy this volt per turn condition.

A power modulator in general has a wide variety of applications, ranging from radar systems, lasers, cancer treatment, microwave heating, in processes sterilizing materials, particle accelerating (LINAC) drive, plasma heating for nuclear fusion, semiconductor cleaning, surface treatment, e-beam pumping of gas lasers, ink-curing in the printing industry, driving piezoelectric or magnetostrictive transducers for sonar, medical ultrasound imaging, driving antenna structures for monopulse wide-band radar, driving high currents and high voltages in aerospace vehicles, lightning or nuclear weapon effects simulation, and to directly drive electron beam sources for material modification, driving klystron, magnetron, gyrotron or cross-field amplifier tubes to generate microwaves for radar, etc. And a power modulator such as in the present invention can, of course, be used elsewhere whenever there is need for electrical pulses.

A Modulator Design Example

What follows is an example of how to design a power modulator, according to the principles of the invention. This example is just illustrative and all the numbers and specific devices are only included for pedagogical reasons and should not be seen as restrictions to the present invention.

a. Selection of Number of Pulse Generating Modules

A productive approach to understanding the new modulator concept is to work through a first-order design exercise for such a modulator. Suppose we are required to make 120 kV pulses, with 70 ampere peak current at a 5 microsecond ($\mu$S) pulse width and 800 pulse-per-second (800 Hz) pulse repetition frequency (PRF). Suppose further that we can obtain IGBT solid-state switches with 1600-volt, 2200 ampere ratings.

The first step is to calculate the peak power output, as this has a strong influence on the number of switches we will need. The peak power is 120 kV times 70 amps, or 8.4 megawatts (8.4 MW). Allow a safety margin for the switches, so they do not operate at their maximum ratings. Experience has shown that 75 percent of peak rating allows a safe margin for long life. Then the operating numbers for each switch should not exceed 0.75×1600=1200 volts and 2200×.75=1650 A. As a result, each switch can develop 1200×1650=1.98 MW. To deliver 8.4 MW, we will need 8.4/1.98=4.24 switches, so we will use five switches to remain on the safe side of the design.

In prior-art modulators, built under U.S. Pat. No. 5,905,646, one is restricted to having one pulse generating module per primary winding and at least one primary winding per core section. With the present invention, as stated earlier in the description, this restriction is removed, and one can use any number of modules. If, for example, one uses a pulse transformer with two cores to obtain a ½-turn primary winding, then there are four "legs" or magnetic core sections in such a transformer. The prior art requires that each such "leg" or core section be driven by the same number of modules. One cannot use four modules, as this violates the safety margin selected in this example. So with the prior art, one would be forced to use eight (8) modules, driving each core "leg" with two modules. But with the present invention, one can use five (5) modules and still provide the same drive signal to each of the four transformer core "legs".

b. Capacitor Size and Pulse Flatness

The number of pulse generating modules has, in this example, been decided (five), at least for our first-order design. Further iterations of the design involving heat transfer and cooling of switches, capacitors, and other components may cause this number to change slightly, but that level of design detail is beyond the scope of the present discussion. Now we turn briefly to the capacitors used in each module. If a capacitor of value C Farads is charged to some voltage V and is then connected to a load drawing a current I amperes for a time T seconds, the voltage of the capacitor will "droop" or "ramp downward" according to the relation:

$$\Delta V = \Delta Q/C = IT/C,$$

where Q is the symbol for charge (in Coulombs) and the delta ($\Delta$) symbol means "the change in". The equation then reads "the change in voltage V equals the change in the charge divided by the capacitance C". This follows at once from the definition of capacitance, which is the amount of charge in the capacitor per voltage applied:

$$C = Q/V.$$

Now suppose, by way of example, we have a requirement for a pulse that has a flat top with no more than 0.5 percent deviation from the average value of pulse voltage. In the present example, the starting voltage is 1200 volts, so the voltage at the end of the pulse should be not less than 0.5 percent below this, or 0.995×1200=1194 volts. The value of V is then six volts. The current per module has been determined as 1650 amps (1650 A), and the pulse duration T is 5 $\mu$S, so the capacitance is found to be:

$$C = Q/V = \Delta Q/\Delta V = IT/\Delta V = 1650 \cdot 5 \cdot 10^{-6}/6 = 1375 \cdot 10^{-6} = 1375 \; \mu F.$$

This is a very large capacitance. To reduce the need for such a large capacitance, one may optionally use a pulse flattening circuit, which can reduce the capacitance by approximately a factor 10. If one uses such a circuit, the capacitance can be reduced to approximately 137.5 $\mu$F rather than 1375 $\mu$F.

c. Module Circuit

We have decided the number of switches (5) and the size of the module capacitors (1200 volt, 138 $\mu$F). For cooling reasons, we may divide the capacitors into two or three separate containers, to increase the ratio of surface area to volume, as this improves the ability to remove waste heat. So the final capacitor value might be 138/2=69 $\mu$F or 138/3=46 $\mu$F. These components are now assembled into pulse generating modules in the form shown in FIG. 6.

Figure 6:
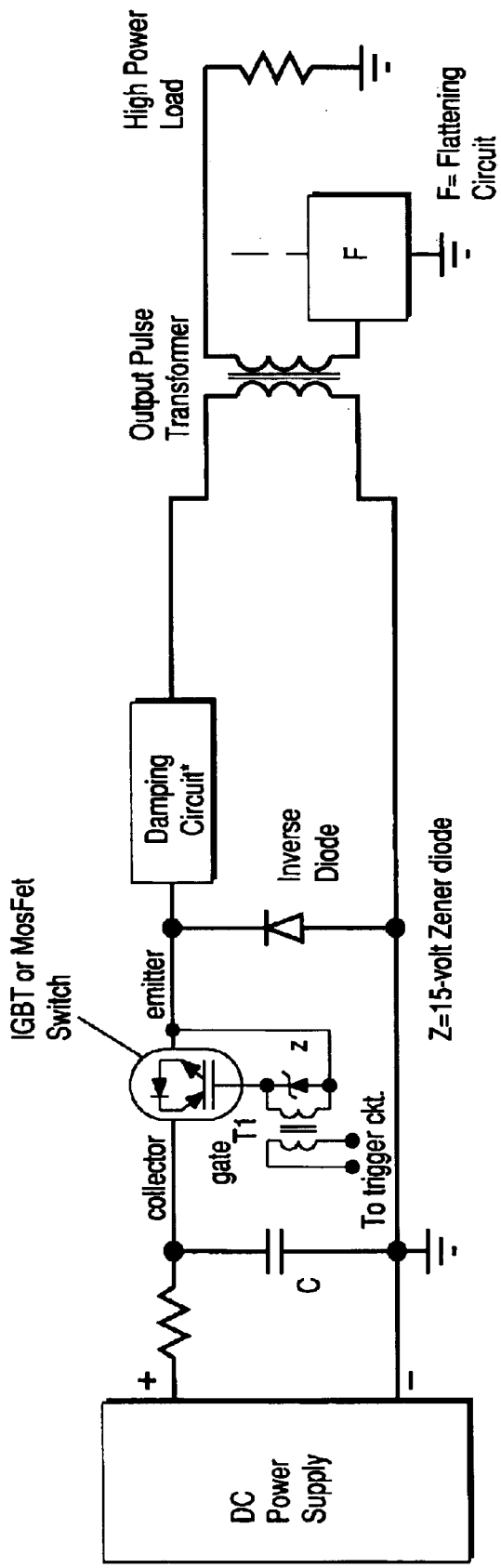
FIG. 6 is a detailed view of one of the pulse generating modules in one embodiment.

In FIG. 6, the ground connection is shown attached to the negative end of the capacitor. This is a flexible choice—the ground connection could just as well be placed at the emitter end of the switch. Doing that would allow the trigger pulse generating circuit to be ground-based, eliminating the small pulse transformer T1 which insulates the gate connection from ground in the circuit as shown.

The inverse diode is also shown connected across the output of the module. This diode is reverse-biased when the switch is conducting, but when the switch is turned off (made non-conducting), the output current continues to flow because of the inductance of the pulse transformer. The inverse diode becomes conducting and clamps the output voltage to near zero at this time, protecting the switch from a destructive over-voltage condition that would destroy it if the inverse diode were not present. In the prior art modulator, a difference in timing between two adjacent pulse generating modules will cause this inverse diode to turn on prematurely. Then when the switch that connects to this diode turns on, the conducting diode is suddenly turned off. This transient usually destroys the diode, making it a short circuit. This in turn destroys the switch by allowing too much current to flow in the switch.

The optional pulse flattening circuit is shown connected in series with the low voltage end of the pulse transformer secondary winding(s) in FIG. 6. The damping circuit is shown connected in series with the module output in FIG. (6). As described above, the prior art modulator required one such damping circuit for each module, but the new connection concept allows the modules to turn on at different times, and this feature allows us to use only one damping circuit. The module connected to this single damping circuit turns on first, and when the output pulse has reached its peak and the voltage is stabilized, the other modules are then turned on to carry the pulsed load. All modules would in this case turn off at the same time. This saves cost and complexity.

e. Pulse Transformer Considerations

FIG. 7 shows a typical high voltage pulse transformer used in pulsed modulators. The magnetic core is labeled by (15), and the high voltage output connections (grading rings) are labeled by (16). The dimensions are proportional to the voltage and power of the modulator output. Typically, such transformers are immersed in a tank filled with mineral-based or silicone-based insulating oil to improve both cooling and high voltage insulation.

The magnetic core shown in FIG. 7 is a single-core assembly. In a double-core transformer, two identical cores are placed side-by-side and both are surrounded by the secondary windings, while each core carries an individual set of primary windings. This provides a half-turn primary behavior, as described above. Three or more cores can be similarly placed, providing ⅓ or ¼-turn primary performance, respectively. The SLAC (Stanford Linear Accelerator Center) modulators, for example, use many more than four cores, and very few (one to three) turns on the secondary. What guides the choices of number of cores and number of secondary turns? Pulse rise and fall-times guide these choices, as will now be described. We will return to the design example to aid in this description.

Figure 8:
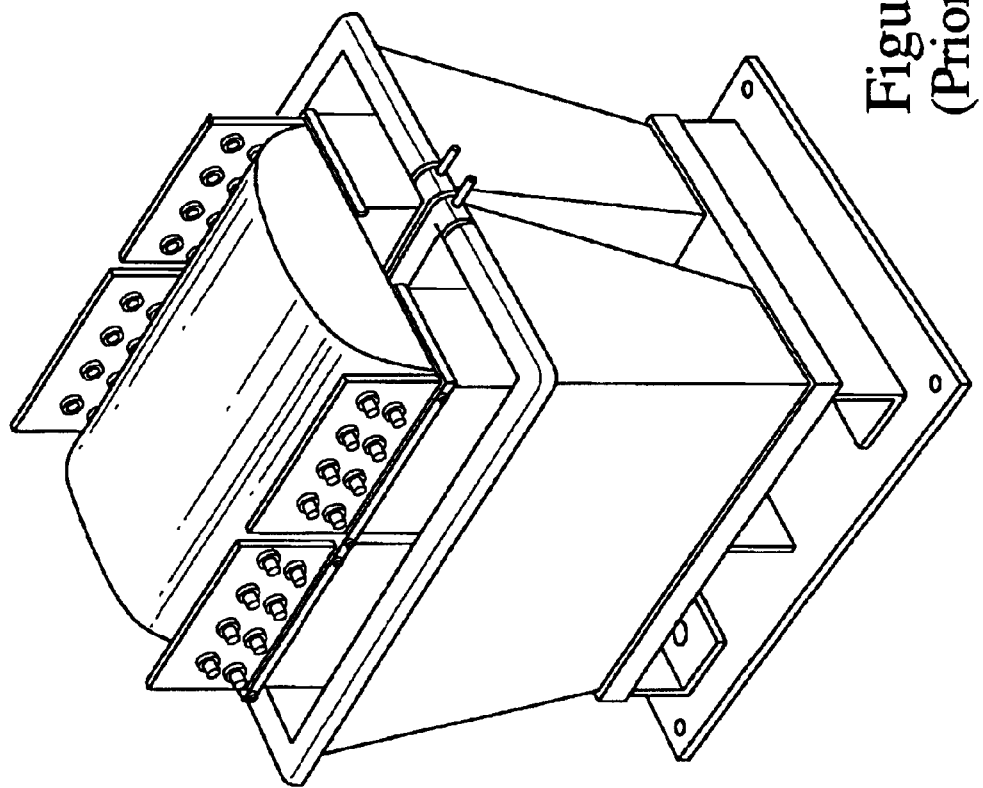
FIG. 8 is a three dimensional view of a pulse transformer that contains two cores side-by-side.

The gap between the two cores is clearly visible in FIG. 8. Comparing FIGS. 7 and 8, we see that there is a volume of space between the secondary windings (that surround all the cores), and the primary windings. When the transformer is operating, Ampere's Law tells us that there is almost no magnetic field anywhere in the transformer (including in the core material itself) except in this volume between the windings. This magnetic field stores magnetic energy, and this equates to an inductance that appears in series with the load. The inductance is in series and not in parallel because no current can reach the load unless it first flows through the windings and sets up this stray magnetic field. This field represents a "tax" on the transformer performance that must be paid in order to obtain any output power. The inductance created by this volume of magnetic field is called the Leakage Inductance of the transformer.

It is well known that inductance of a coil is proportional to the square of the number of turns in the coil. When measured from the secondary or output side of the transformer, this leakage inductance is proportional to the square of the number of secondary turns. Consequently, anything that can reduce the number of secondary turns will have a marked affect on the leakage inductance. The smaller this inductance can be made, the faster the output pulse can rise up to its maximum power level. Using a fractional-turn primary by installing two cores side-by-side, each with their own set of primary turns, will cut the number of secondary turns in half for a given input and output voltage. This will (nearly) reduce the leakage inductance by a factor of four, and will allow the pulse to rise almost four times faster than if a single core were used.

This argument is not exact, as the leakage inductance is proportional to the volume contained between the primary and secondary assemblies as well as the square of the secondary turns, and this volume will increase as we add more cores to the transformer. The reduction in leakage inductance when we go from one to two cores is closer to ⅓ than ¼ for this reason. But the effect is still very useful in obtaining a faster rise and fall-time for the pulse transformer.

Figure 1:
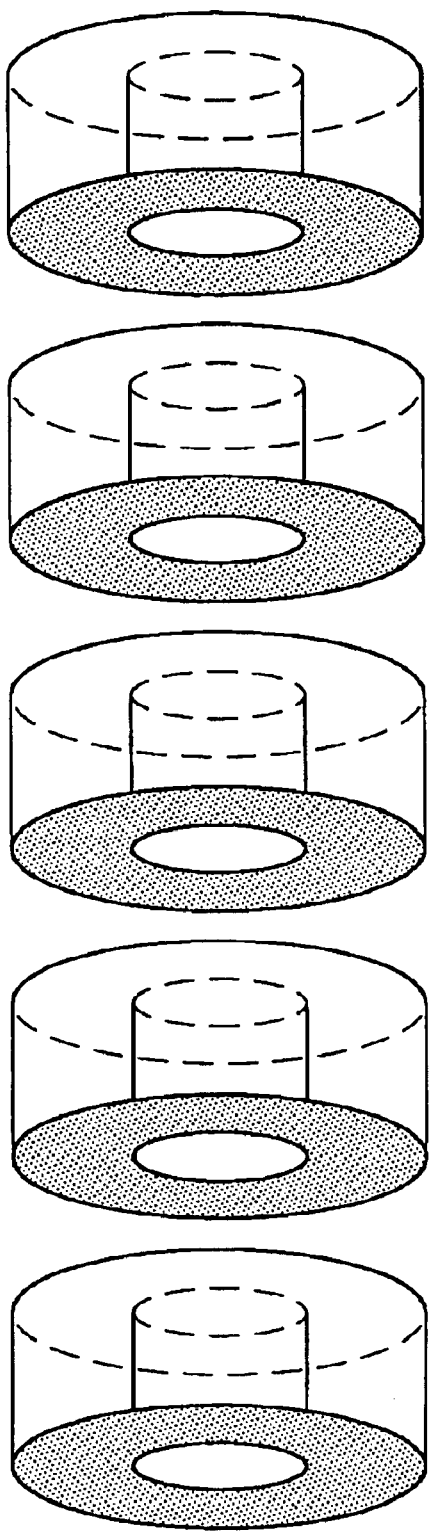
FIG. 1 shows a magnetic core arrangement for LMI accelerator.
Figure 2:
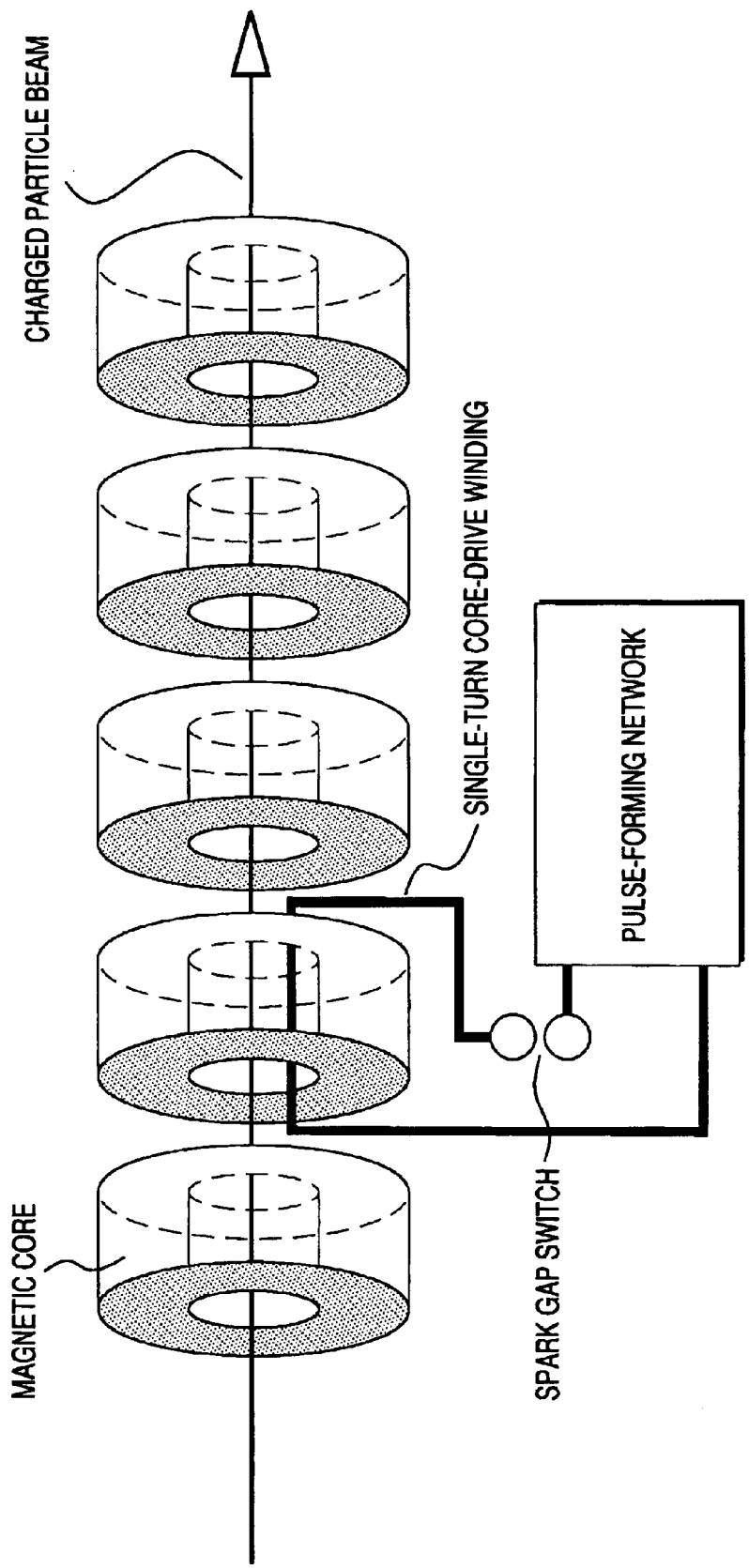
FIG. 2 shows LMI accelerator with one PFN and a beam path.
Figure 3:
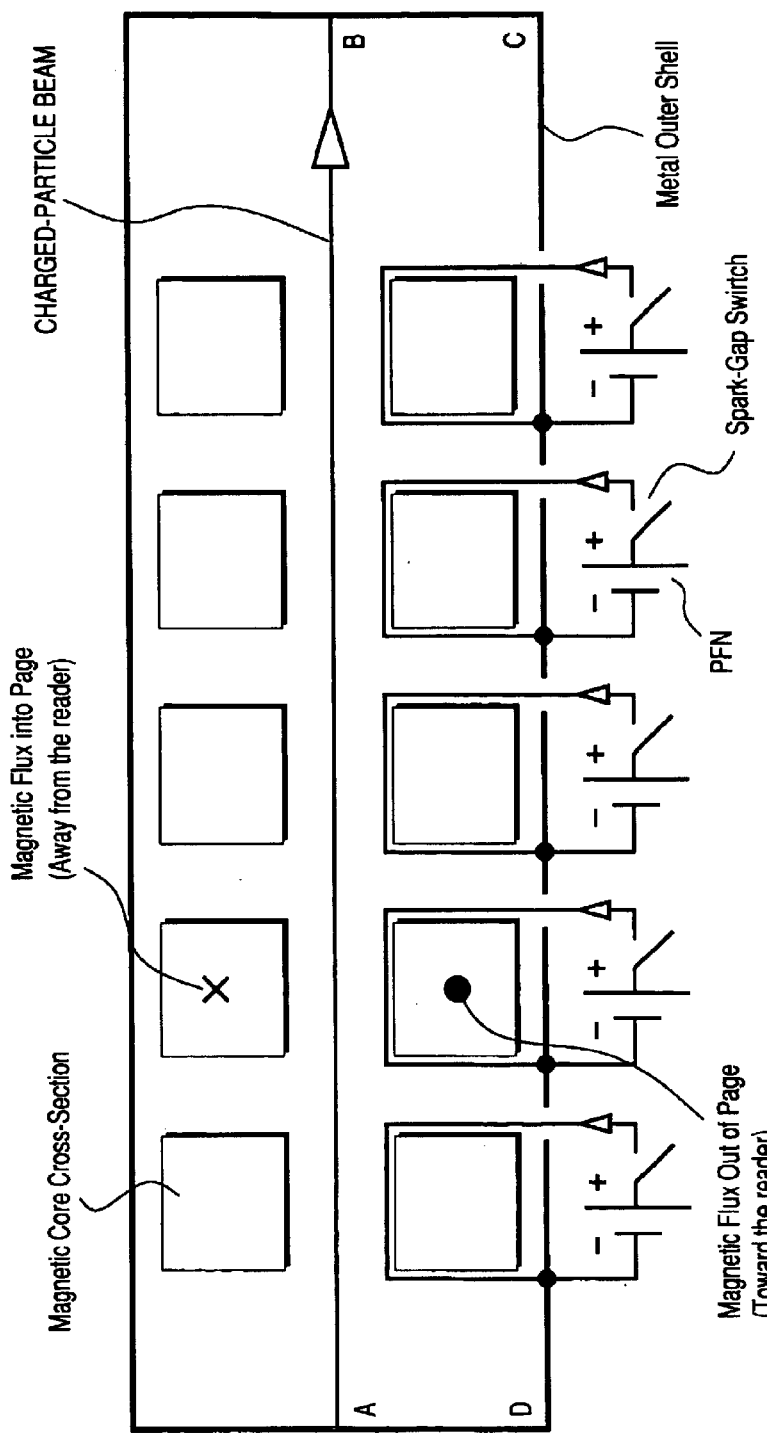
FIG. 3 shows a structure for a five core LMI accelerator.
Figure 4:
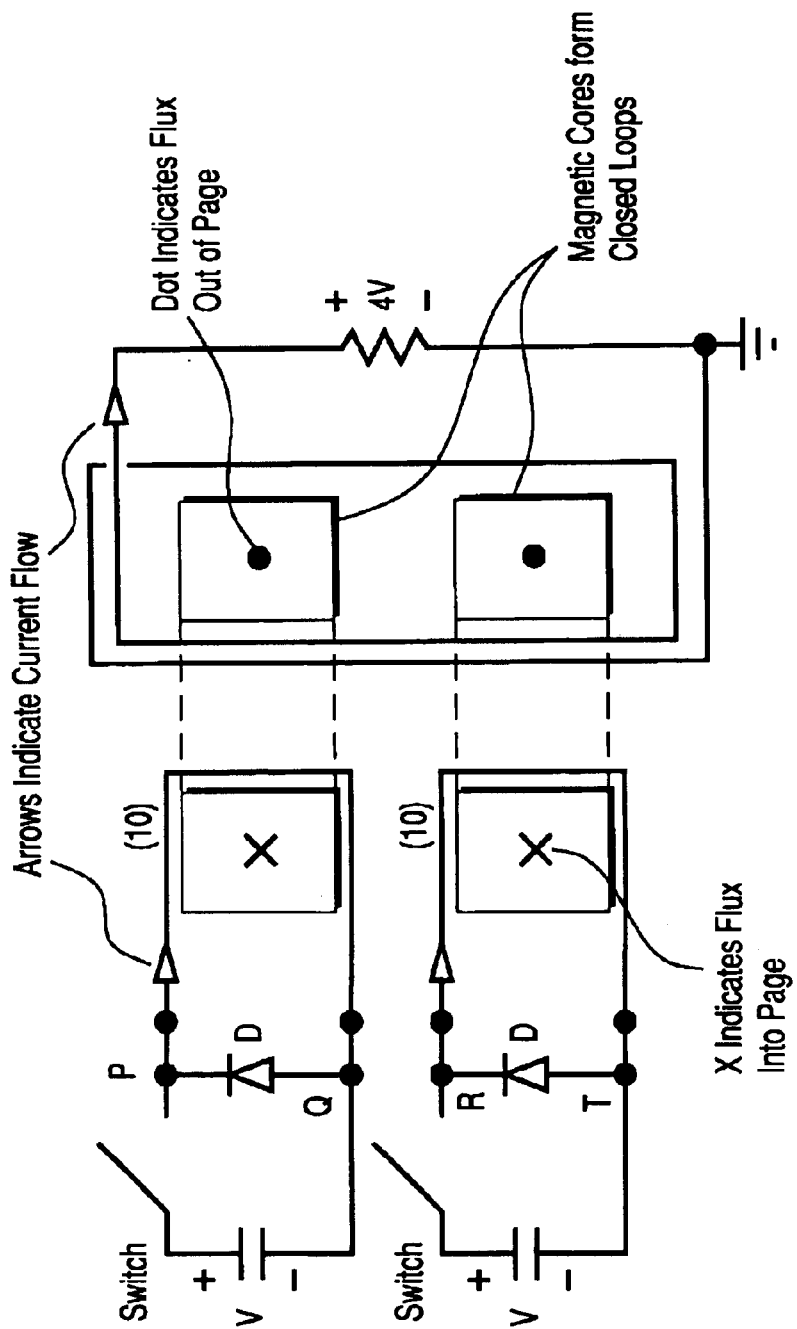
FIG. 4 shows a schematic view of a half-turn primary connection with two pulse generating modules according to prior art.

Again examining FIGS. 2 and 3, we see that with two cores, there are four vertical "legs" of magnetic material that must be surrounded with primary turns. This was mentioned earlier in this discussion, and the reason for this is clearly evident in the two Figures. With a single core, there are two such vertical "legs", etc. In general, with N cores there are 2N "legs" that need primary turns around them. Basically, the multi-core transformer is equivalent to several transformers connected in parallel.

To complete the design example, we need to dimension the transformer. Suppose the magnetic material has a saturation flux density of Bmax Teslas. Typical values for this flux density are in the neighborhood of one Tesla, or 10,000 Gausses, using the older magnetic unit system. We wind a set of turns around the cores to carry a DC current for resetting the cores. These turns are connected to a DC power supply through a series reset choke, as the reset turns will develop a pulsed voltage when the transformer is driven by the pulse generating modules, and we need a high series impedance to protect the DC supply from this pulse and to insure that the reset current is not affected by the pulse. The reset choke keeps the reset current flowing constantly regardless of the pulsing action in the transformer.

The DC reset current induces a DC flux density in the cores equal to −Bmax, the minus sign indicating that this flux is directed opposite to the flux that will be induced when the transformer is pulsed. This allows the cores to be made with half the magnetic material that would be needed if no reset were used, because the flux density can now swing from −Bmax to +Bmax during the pulse, for a total flux excursion of 2 Bmax. Each magnetic core has a cross-sectional area (see FIG. 2) of Ac square meters. Then Lenz's law states that with the given module voltage V and pulse duration T, if we use a single turn primary the cross sectional area of each core is computed by:

$$A_c = V \cdot T / 2\, B_{max}.$$

Inserting the numbers V=1200 volts, T=5 uS, Bmax=1 Tesla, we find Ac=0.003 square meters or 30 square cm. So the cross-sectional area of each of the two cores is about 5.5 cm wide and 5.5 cm deep, typical of transformers we have built. We have usually designed for longer pulse widths of 10 to 12 uS, so the cores have been larger than this, again per the above equation.

We then want 120 kV output with 1.2 kV input, so the voltage gain is 100:1. This requires 50 turns on each of the two parallel-connected secondary "baskets" shown in FIGS. 2 and 3. This reflects the fact that the primary is effectively ½ turn. The voltage gain equals the turns ratio, which in this case is 50/0.5=100.

We have, as mentioned before, four vertical core "legs" to surround with primary turns, as we are really making two parallel-connected transformers. Each of these "legs" needs five turns around it, as we are going to use five modules. Each module is then connected to a set of four single-turn primaries, one turn of each set for each of the four "legs". So the total number of primary turns we need is 5 modules times 4 leg-turns per module, or 20 primaries. This gives five turns per "leg", which agrees.

It should be mentioned that to keep the stray inductance low, one needs to surround each core "leg" with a good approximation of a "current sheet" to keep the magnetic fields between the individual wires to a minimum. Five small-diameter wires, spaced along a core leg that may be 15 cm in length for 120 kV, is not a good approximation of a uniform sheet of current, so one may make the five single turns by winding, for example, ten or even twenty single wires around the core leg, and then separating these single turns into five bundles of two or three or four single turns each, connecting each bundle in parallel to make the equivalent of a wide single turn.

In the design example, we want 800 Hz PRF, and each pulse delivers an output energy of Vsec×Isec×Tpulse=120 kV×70 A×5 uS=42 joules per pulse. At 800 Hz repetition rate, this represents an AVERAGE power of 800×42=33,600 watts or 33.6 kW. The duty factor is the ratio of pulse duration to time between pulses, in this case 800×5 uS=0.004 or 0.4 percent. The RMS (root-mean-square) value of the current is the peak current times the square root of the duty factor, which in this case is 70 A times 0.063, or 4.4 amperes for the total secondary current. The secondary is made of two parallel-connected windings per FIGS. 7 and 8, so each of these windings carries an RMS current of 2.2 amperes. The wire cross-section is sized accordingly from standard wire tables to carry this current.

Similarly, for each primary the peak current is 1650 amperes, so the RMS current is 104 amperes. Again, the primary conductors are sized from standard tables to carry this current, taking into account the heat transfer/cooling means that are available to cool the conductors to a safe level.

This completes the connection of the modulator, except for dimensioning the reset winding and reset current. This involves the permeability of the magnetic material, which is the ratio of magnetic flux density B in Teslas to magnetomotive force H in ampere-turns per meter, and is a property that is tabulated in catalogs of magnetic material. When this number is determined, the selection of reset turns and reset current involves a simple application of Ampere's law and does not need further elaboration here. It is very well known technology.

The embodiments and the design example given above are merely illustrations. There are other embodiments that will readily occur to one skilled in the art that are within the scope and spirit of the invention. The invention should therefore be defined as in the appended claims.

We claim:

1. A power modulator having at least two pulse generating modules, and including at least one secondary winding that surrounds all of a plurality of magnetic cores, each of said at least two pulse generating modules comprising: an energy storage capacitor and switching means electronically controllable at turn-on and turn-off, and at least one diode or an assembly of series-connected diodes connected in parallel with the output conductors of said pulse generating module:

wherein each pulse generating module further includes a set of primary windings, each said primary winding in each said set of primary winding surrounding a respective one of said plurality of magnetic cores, and each said primary winding in each said set of primary windings being connected in parallel to at least one said pulse generating module to thereby provide a power modulator wherein each of said at least two pulse generating modules drives all of said plurality of magnetic cores.

2. A power modulator as in claim 1, wherein said switching means is an IGBT solid-state switch.

3. A power modulator as in claim 1, wherein said set of primary windings is a set of single-turn primary windings.

4. A power modulator as in claim 1, wherein the number of pulse generating modules is equal to the number of magnetic cores.

5. A power modulator as in claim 1, wherein said switching means is an IGBT solid-state switch.

6. A power modulator as in claim 1, wherein the number of pulse generating modules is equal to the number of magnetic cores.

* * * * *